United States Patent
Lee et al.

(10) Patent No.: US 6,614,810 B1
(45) Date of Patent: Sep. 2, 2003

(54) METHOD FOR PROCESSING DATA TO BE TRANSMITTED OVER COMMON CHANNEL

(75) Inventors: Hyun-Seok Lee, Seoul (KR); Dae-Gyun Kim, Seoul (KR); Sun-Mi Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/396,820

(22) Filed: Sep. 14, 1999

(30) Foreign Application Priority Data

Sep. 14, 1998 (KR) .............................. 98-38351
Oct. 2, 1998 (KR) .............................. 98-41939

(51) Int. Cl.[7] .................................. H04J 3/16
(52) U.S. Cl. ...................... 370/471; 370/479
(58) Field of Search ................. 370/390, 432, 370/401, 469, 389, 465, 524, 467, 397, 405, 237, 474, 475, 476, 470–471, 356, 231, 316, 479

(56) References Cited

U.S. PATENT DOCUMENTS

| | | | | |
|---|---|---|---|---|
| 4,775,974 A | * | 10/1988 | Kobayashi | 370/469 |
| 4,878,216 A | * | 10/1989 | Yunoki | 370/389 |
| 4,922,484 A | * | 5/1990 | Yoshida et al. | 370/524 |
| 4,964,119 A | * | 10/1990 | Endo et al. | 370/237 |
| 4,975,906 A | * | 12/1990 | Takiyasu et al. | 370/401 |
| 5,610,917 A | * | 3/1997 | Diachina | 370/469 |
| 5,706,428 A | * | 1/1998 | Boer et al. | 370/465 |
| 5,818,826 A | * | 10/1998 | Gfeller et al. | 370/465 |
| 5,959,989 A | * | 9/1999 | Gleeson et al. | 370/390 |
| 6,201,811 B1 | * | 3/2001 | Larsson et al. | 370/397 |
| 6,400,701 B2 | * | 6/2002 | Lin et al. | 370/524 |

* cited by examiner

*Primary Examiner*—Steve N Nguyen
*Assistant Examiner*—Phuongchau Ba Nguyen
(74) *Attorney, Agent, or Firm*—Dilworth & Barrese, LLP (57) ABSTRACT

A method for processing a common channel message in a CDMA communication system. The method includes mapping a signaling message generated in a Layer 3, a medium access control (MAC) message generated in a MAC sublayer and user data, to be transmitted over common channels to corresponding common logical channels; adding identifiers corresponding to common logical channels to the received signaling messages; processing the common logical channel identifier-added messages according to a common radio burst protocol using a single sequence number; and mapping the messages processed according to the common radio burst protocol to corresponding common channels.

4 Claims, 9 Drawing Sheets

METHOD FOR PROCESSING DATA TO BE TRANSMITTED OVER COMMON CHANNEL

BACKGROUND OF THE INVENTION

1. Field of the Invention

The present invention relates generally to a message processing method for a CDMA communication system, and in particular, to a method for processing user data and message to be transmitted over a common channel.

2. Description of the Related Art

Code division multiple access (CDMA) mobile communication systems, which have conventionally provided a voice-based service, can now provide a high speed packet data service. In a mobile communication system which mainly provides a voice service, control information is generally generated during call setup, handoff and call release. The control information is mostly Layer 3 (i.e., network layer) control messages and is transmitted over a signaling channel.

However, packet data has a bursting property which means that data is not continuously generated. Accordingly, taking into consideration the limited capacity of radio resources, the capability of mobile stations and the limited power consumption of mobile stations, a system providing a packet data service assigns a dedicated channel only when traffic is generated, instead of continuously assigning a dedicated traffic channel and a dedicated control channel to every user over the service time. Upon completion of transmitting the packet data, the system releases the dedicated channel in use after lapse of a predetermined time so as to enable other users to use the resource. To this end, a medium access control (MAC) sublayer is provided between a physical layer (i.e. Layer 1) and a link layer (i.e., Layer 2), to more effectively use the limited resources of the system. Control information generated in the MAC sublayer is transmitted over a MAC channel.

Figure 1:
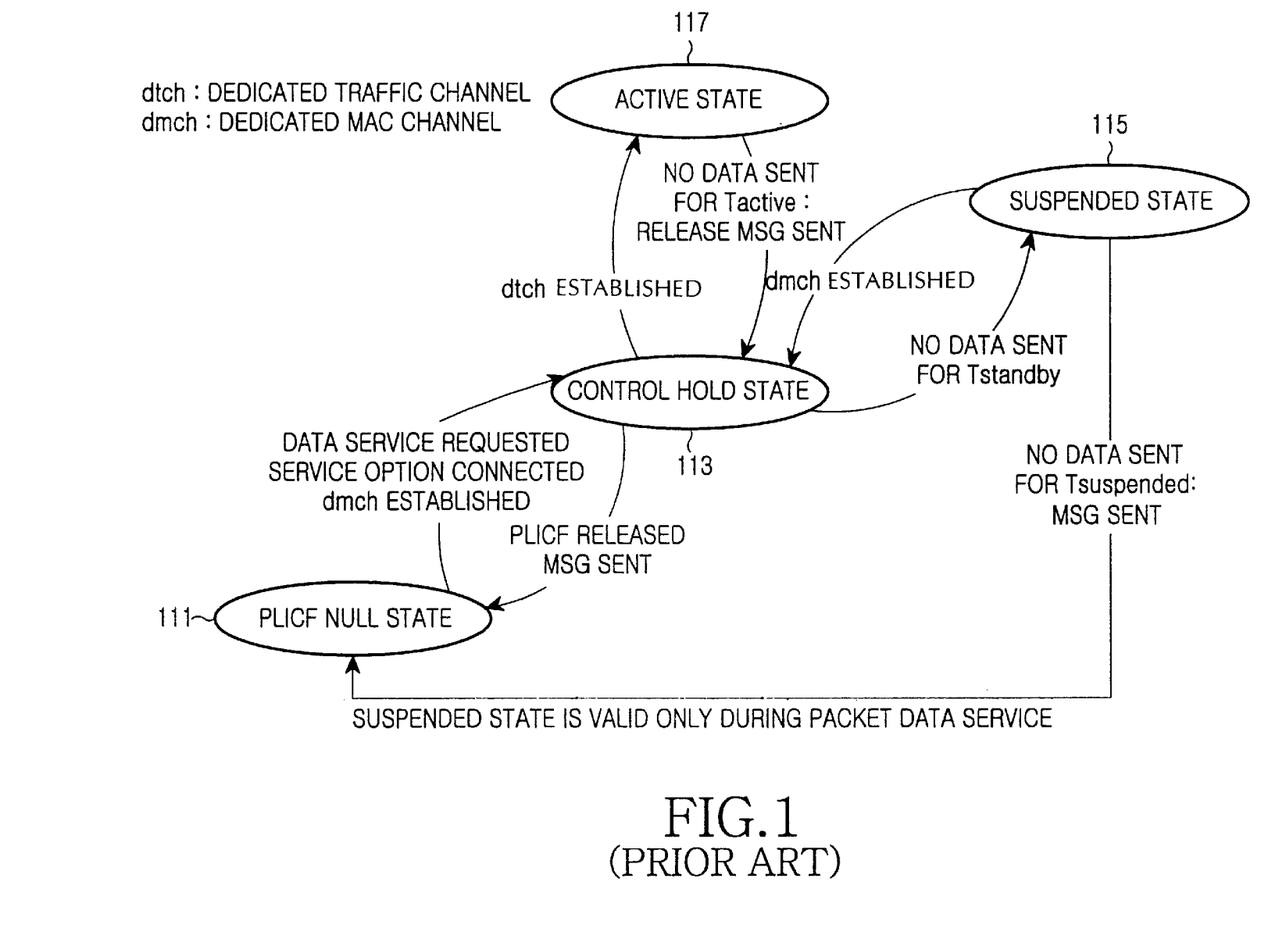
FIG. 1 is a diagram illustrating state transitions of a MAC sublayer supporting a data service in a conventional CDMA mobile communication system.

FIG. 1 illustrates state transition performed in a CDMA mobile communication system. The system is initially in a physical layer independent control function (PLICF) null state 111, when there is no service request. When a service request occurs in the null state 111, a base station and a mobile station exchange information required for the service through a common channel to connect a service option and establish a dedicated MAC channel (dmch) and a dedicated signaling channel (dsch), thereby to transition to a control hold state 113 where a message generated in the MAC sublayer and a control message generated in Layer 3 are exchanged between the mobile station and the base station.

When establishment of a dedicated traffic channel (dtch) for transmitting user data is completed in the control hold state 113, the base station and the mobile station transition to an active state 117 to exchange high speed packet data. A sequence number and an acknowledgement required indicator (ACK_REQ), generated in a radio link protocol (RLP) for securing reliable transmission, are added to the user data and then transmitted through a dedicated traffic channel. In the active state 117, every dedicated channel can be used; specifically, user data is transmitted over a dedicated traffic channel, and control information generated in the Layer 3 and control information generated in the MAC sublayer are transmitted over the dedicated signaling channel and the dedicated MAC channel, respectively, as in the control hold state 113.

When data is not generated for a predetermined time in the active state due to the property of the packet data, the base station and the mobile station release the dedicated traffic channel and then transition to the control hold state 113. In the control hold state 113, the dedicated signaling channel and the dedicated MAC channel are connected.

When data to be transmitted is not generated for a predetermined time in the control hold state 113, even the dedicated signaling channel and the dedicated MAC channel are released, and then a transition occurs to a suspended state 115 where only common channels are established. In the suspended state 115, information about the service and the dedicated channels are maintained so that upon generation of data to be transmitted over the dedicated channels, it is possible to reestablish the dedicated channels in a short time and then transition to the active station 117. When data to be transmitted is not generated for a predetermined time in the suspended state 115, the service information and the dedicated channel information, which have been holding the service, are deleted and then a transition to the null state 111 occurs.

In the suspended state 115 of FIG. 1, every dedicated channel is released and only the common channels exist. At this point, short data bursts (SDB) are transmitted by a radio burst protocol .(RBP) entity. To secure reliable transmission by the RBP entity, control files for a sequence number and an acknowledgement required indicator ACK_REQ are added by an automatic repeat request (ARQ) function block, a mobile station identifier (MSID) for identifying a data transmitter or receiver is added by an address function block, and then those are transferred to a common traffic channel mapping entity. Prior to being transferred to a common channel mapping entity, a length field and an error checking control field are added to the user data. The radio burst protocol generates one entity for every service and one mobile station can simultaneously provide one or more services, so that a service identifier is added to the user data in the common traffic channel mapping entity. The user data transferred to the common traffic channel mapping entity is mapped with a physical channel and transmitted to a receiver of the other party.

Figure 2:
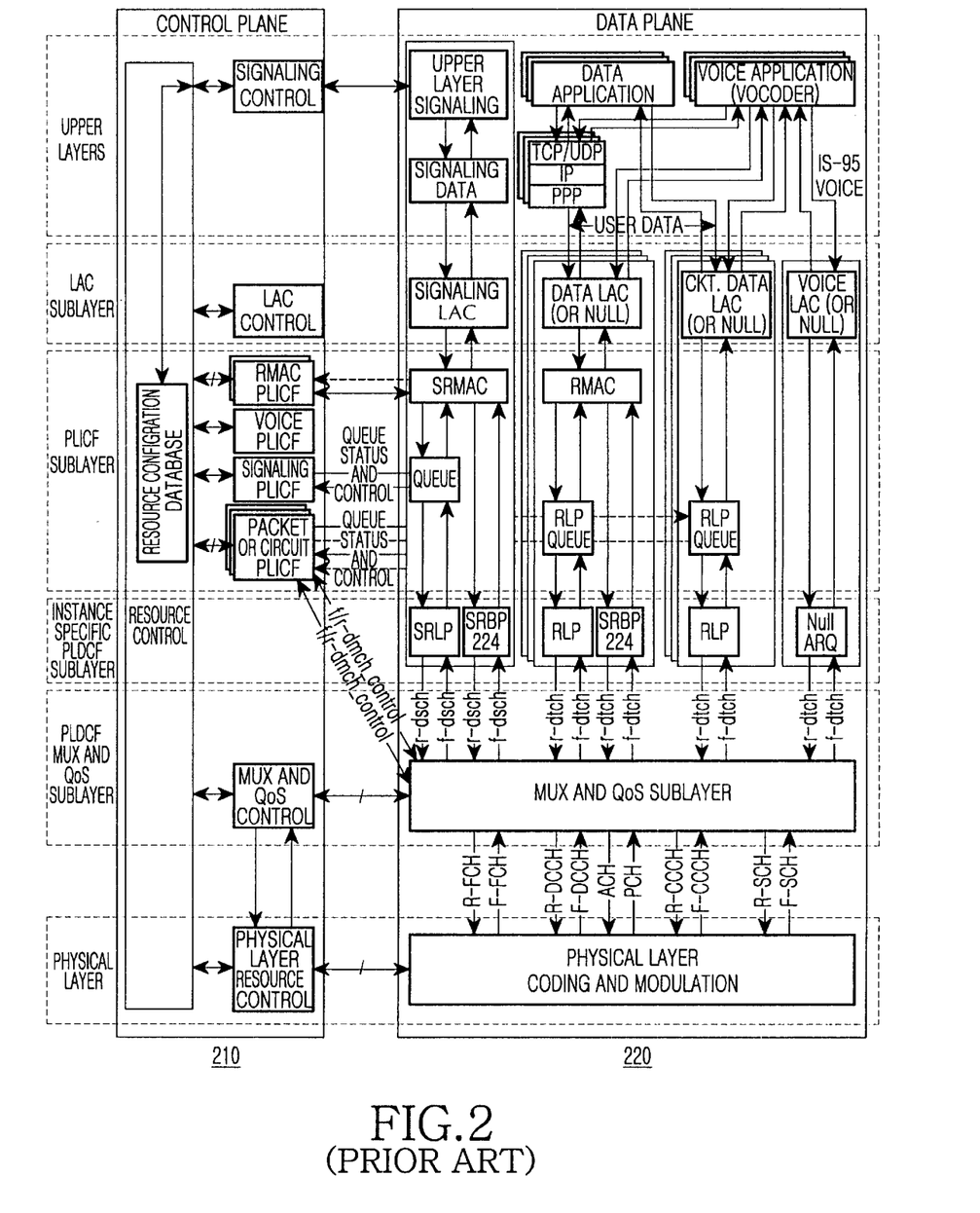
FIG. 2 is a diagram illustrating a stacked protocol structure supporting a data service in a conventional CDMA mobile communication system.
Figure 3:
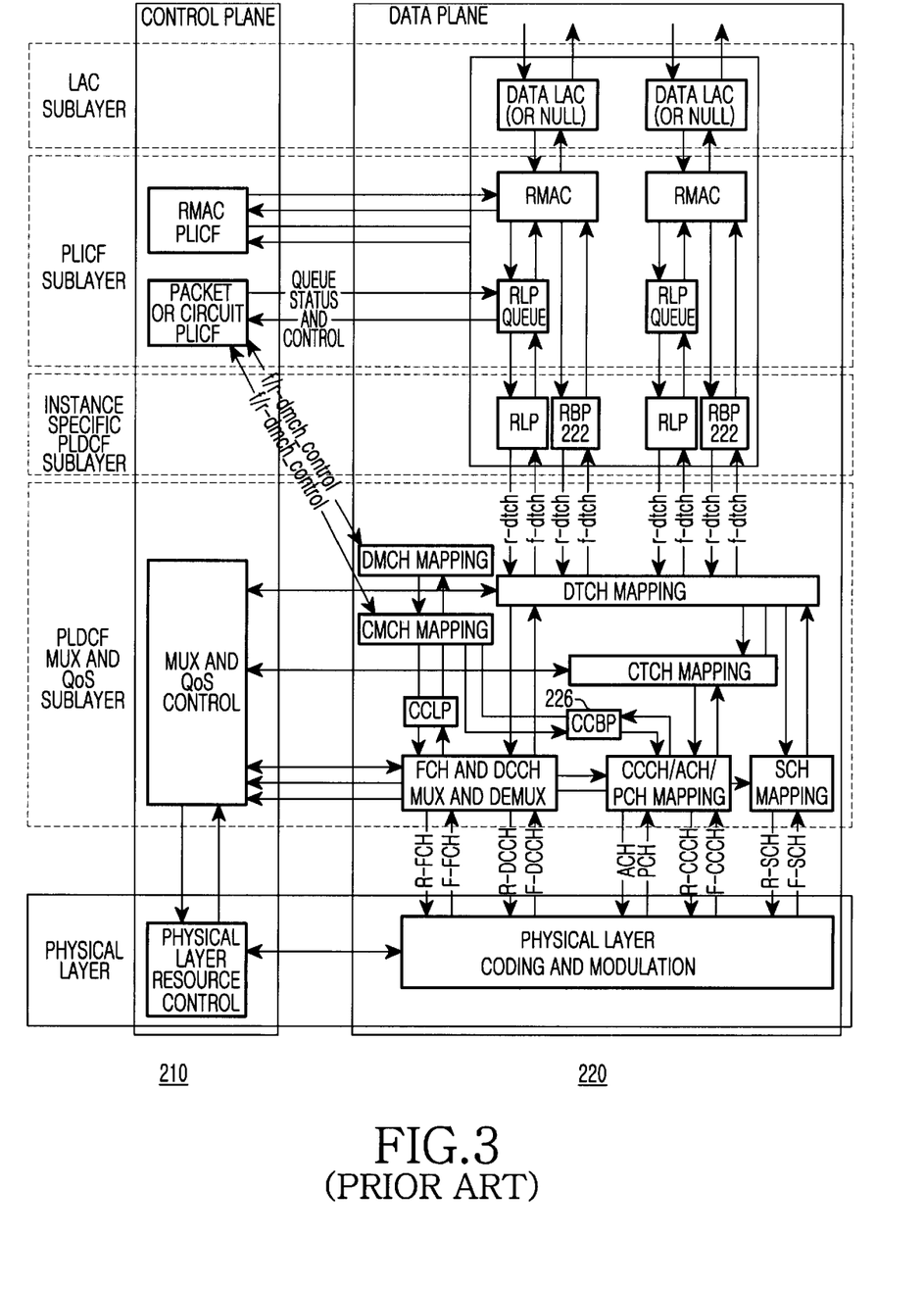
FIG. 3 is a detailed diagram illustrating a data plane of the stacked protocol structure supporting a data service in a conventional CDMA mobile communication system.

FIG. 2 is functional block diagrams illustrating a control plane 210 and a data plane 220 for a mobile communication system providing a data service. FIG. 3 is a detailed diagram of a function block in the data plane 220 of FIG. 2, for processing user data transmitted over a common traffic channel (ctch) and a MAC message transmitted over a common MAC channel.

Referring to FIG. 3, a radio burst protocol (RBP) entity 222 processes the short burst user data generated in the suspended state 115, a signaling radio burst protocol (SRBP) entity 224 processes a control message generated in Layer 3, and a control channel burst protocol (CCBP) entity 226 processes a control message generated in the MAC sublayer.

When short burst user data is generated in the suspended state 115, one to seven filler (i.e., "0") bits are inserted in the short burst user data to construct the data in units of a byte (one byte=8 bits). Further, a length field LEN for indicating a length of the data and a cyclic redundancy check (CRC) code for error checking at a receiver are added and then transferred to a common traffic channel mapping entity. In the common traffic channel mapping entity, a service identifier (SID) for identifying data generated in the radio burst protocol of various services and a mobile station identifier MSID for identifying a data transmitter are added and then transferred to the common control channel/paging channel/access channel (CCCH/PCH/ACH) mapping entity.

When a Layer 3 control message is generated in the suspended state 115, a sequence number is assigned for securing reliable transmission in an upper link access control (LAC) sublayer, a mobile station identifier MSID is added, and then transferred to the signaling radio burst protocol entity 224. The signaling radio burst protocol entity 224 inserts "0" bits in the control message to generate the data on a byte unit basis, as in the radio burst protocol entity 222, adds a length field indicating a length of the data and an error checking code, and then transfers it to the common control channel/paging channel/access channel mapping entity.

A MAC message generated in the suspended state 115 is provided to the control channel burst protocol (CCBP) entity 226 after a service identifier is added thereto, in a common MAC channel mapping entity. The MAC message is then processed in the control channel burst protocol entity 226 and transferred to the common control channel/paging channel/access channel mapping entity to be mapped to the physical channel. Here, as shown in FIGS. 2 and 3, the common MAC channel message is not yet defined. That is, in the suspended state, when a control message generated in the Layer 3 is transmitted over the common channel, it plays a role of securing reliable transmission in the link layer which is the Layer 2. However, for the MAC message, a function for securing the reliable transmission is not defined.

As described above, in a mobile communication system which mainly provides a voice service, Layer 2 provides the above function for securing reliable transmission for the control information generated in the Layer 3. Therefore, in the case where control information generated in the MAC sublayer is transmitted over a common MAC channel, there is required a protocol for performing the above control function before the control information is transferred to the physical channel. In addition, it is necessary to define a function of the control channel burst protocol for controlling a MAC message to be transmitted over the common MAC channel in a stacked protocol structure.

Further, as illustrated in FIGS. 2 and 3, in an existing CDMA mobile communication system, since the above function is performed in their respective corresponding protocol entities, there are required three protocol entities. This means that one system has overlapped function blocks, causing an increase in system complexity and difficulty in realizing the system. That is, the protocol entities independently manage areas for storing the data related to the sequence number, thus causing a waste of storage.

In addition, with regard to the control message generated in Layer 3, since the address function block is located at an upper part of the MAC sublayer, an increased processor load may arise which processes every Layer 3 control message transmitted from the MAC sublayer to the common signaling channel and transfers it to the upper link access control sublayer.

SUMMARY OF THE INVENTION

It is, therefore, an object of the present invention to provide a method for transmitting a MAC message through a control channel burst protocol with increased reliability when transmitting the MAC message over a common MAC channel in a CDMA communication system.

It is another object of the present invention to provide a method for unifying, into one entity, common function blocks of separate protocol entities for processing a Layer 3 control message, user data and a MAC message, to be transmitted over a common channel, in a CDMA communication system.

It is a further object of the present invention to provide a method for reducing system complexity by unifying over- lapped function blocks, thereby simplifying realization of the system and increasing system performance.

It is still another object of the present invention to provide a method for reducing a load on a MAC sublayer by placing an address function block in a MAC function block.

The present invention is a novel method for processing a common channel message comprising the steps of: mapping a signaling message generated in Layer 3, a medium access control (MAC) message generated in a MAC sublayer and user data, to be transmitted over common channels, to corresponding common logical channels; adding an identifier identifying each corresponding common logical channel to each message; processing the common logical channel identifier-added messages according to a common radio burst protocol using a single sequence number; and mapping the messages processed according to the common radio burst protocol to corresponding common channels.

To process the common logical channel identifier-added messages, the method further includes adding an automatic repeat request (ARQ) parameter including a message sequence number and an acknowledgement sequence number to the common logical channel identifier-added message; adding an address parameter including a control field for identifying a mobile station to the ARQ parameter-added message, to identify data transmitter or receiver; and adding a message length field and a cyclic redundancy check (CRC) field to the address parameter-added message, to frame the message.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In a CDMA communication system supporting a high speed packet data service according to the present invention, a protocol for processing a MAC message is defined. A Layer 3 control message, a MAC message and user data to be transmitted over a common physical channel are processed by a single radio burst protocol module, so as to reduce system complexity, thereby facilitating realization of the system and improving performance.

In a CDMA communication system according to the present invention, a method for processing data to be transmitted over a common physical channel includes: (a) receiving at least one of a control message generated in Layer 3, a control message generated in a MAC sublayer and user data, to be transmitted over a common channel; (b) adding identifiers for corresponding logical channels so as to identify the received data; (c) processing the identifier-added data in a single common radio burst protocol entity using a single sequence number and outputting the processed data to a physical channel transmission module; and (d) transmitting the processed common channel message through a corresponding common physical channel.

Figure 4:
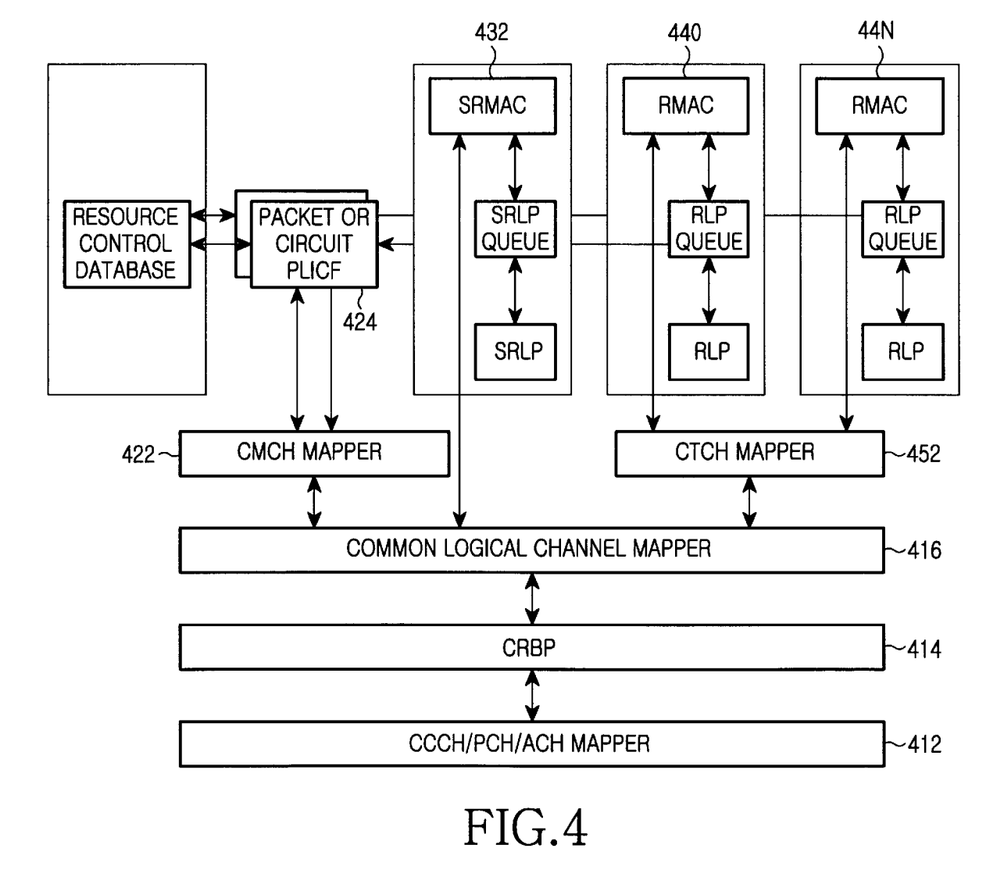
FIG. 4 is a diagram illustrating a stacked protocol structure having a unified module for processing data to be transmitted over a common channel in a CDMA mobile communication system according to an embodiment of the present invention.

FIG. 4 illustrates a stacked protocol structure according to an embodiment of the present invention, which unifies the common protocol function blocks for processing a Layer 3 control message 417, user data 418 and a MAC message 419, to be transmitted over a common channel.

Referring to FIG. 4, during a packet data service, in a suspended state where every dedicated channel is released and only a common channel is maintained, a Layer 3 control message, a MAC message and user data are transferred (i.e., mapped) to a single unifying common control channel/ paging channel/access channel mapping module 412 via a common radio burst protocol module 414. That is, the user data, the Layer 3 control message and the MAC message are unified as a composite message so that the unified data can be processed in a single common radio burst protocol (CRBP) module. Herein, a description will be made with regard to an operation of processing a message on a common channel, and a description of processing a message on a dedicated channel is not pertinent to the present application and will be avoided. Therefore, a description of a radio link protocol (RLP) will be avoided.

Referring to FIG. 4, a PLICF 419 generates a common MAC channel message. An SRMAC 432 generates a common signaling channel message for the Layer 3. RMACs 440–44N generate messages for common traffic channels.

A common logical channel mapper 416 receives a common MAC channel message output from a CMCH mapper 422, a common signaling channel message output from the SRMAC 432 and a common traffic channel message output from a CTCH mapper 452. The common logical channel mapper 416 adds a logical channel identifier (LID) for identifying a logical channel of the data, so as to enable a single common radio burst protocol (CRBP) module 414 to process the three kinds of data.

The common radio burst protocol module 414 reduces system complexity by functioning as a radio burst protocol (RBP) module, a link access control sublayer module, an automatic repeat request function block, an address function block and a framing function block of a control channel burst protocol entity. A detailed description will be made with reference to FIG. 5. Therefore, although the radio burst protocol module, the signaling radio burst protocol module and the control channel burst protocol module conventionally processed data using different sequence numbers, the common radio burst protocol module 414 according to an embodiment of the present invention processes the Layer 3 control message, the user data and the MAC message with a single sequence number.

The physical channel (CCCH/PCH/SCH) mapping entity 412 maps the Layer 3 control message, the MAC message and the user data processed in the upper common radio burst protocol entity 414 to one of a common control channel, a paging channel or an access channel, which are physical channels.

Figure 5:
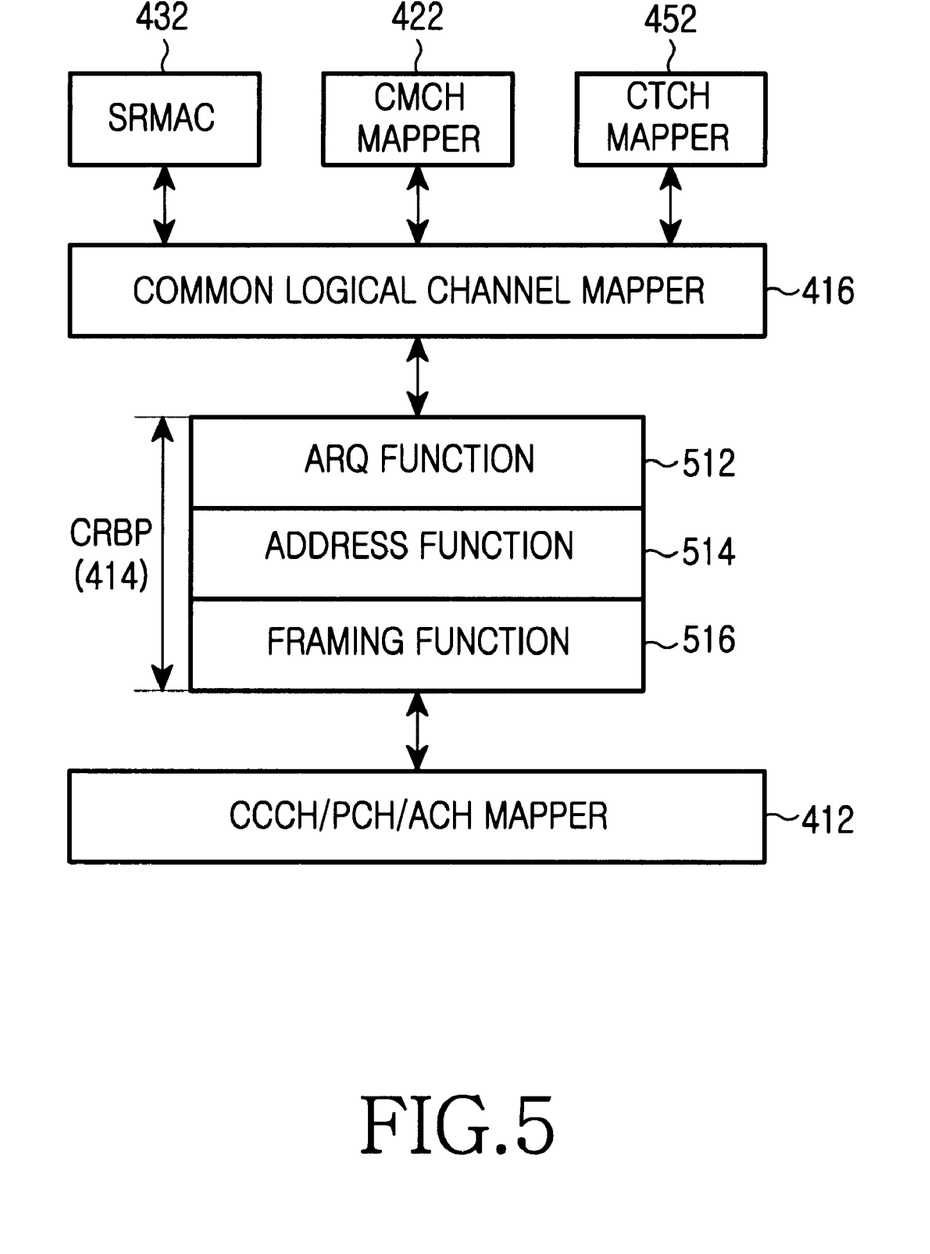
FIG. 5 is a diagram illustrating a common radio burst protocol for a CDMA mobile communication system according to an embodiment of the present invention.

FIG. 5 illustrates, in detail, function blocks of the common radio burst protocol entity 414 of FIG. 4.

Referring to FIG. 5, the SRMAC 432 outputs a Layer 3 signaling message to be transmitted over a common physical control channel. The CMCH mapper 422 outputs a message to be transmitted over a common physical MAC channel. The CTCH mapper 452 outputs a message to be transmitted over a common physical traffic channel. The common logical channel mapper 416 receives the messages directed to one of the common control channel, the common MAC channel and the common traffic channel, respectively output from the SRMAC 432, the CMCH mapper 422 and the CTCH mapper 452, and analyzes the received messages to add corresponding logical channel identifiers LIDs to them.

The common radio burst protocol entity 414 receiving the LID-added common channel messages, is comprised of an automatic repeat request (ARQ) function block 512 for adding ARQ parameters for performing an automatic repeat request function, an address function block 514 for adding address parameters for identifying a data transmitter or receiver, and a framing function block 516 for converting a message so that it can be mapped to a physical channel.

For securing reliable transmission of a message, the automatic repeat request parameters added in the automatic repeat request function block 512 may include control fields of a message sequence number (MSG_SEQ), an acknowledgement sequence number (ACK_SEQ), an acknowledgement required indicator (ACK_REQ), and a valid acknowledgement indicator VALID_ACK. The message sequence number is a sequence number of a message to be transmitted, and the acknowledgement sequence number is a sequence number of a received message, for acknowledging receipt of the message without error. The acknowledgement required indicator (ACK-SEQ) indicates whether the transmitted message requires acknowledgement or not, and the valid acknowledgement indicator (VALID_ACK) indicates whether a message being presently transmitted includes acknowledgement information of the received message.

When a transmission party fills the control fields before transmitting the message, a receiving party determines whether to transmit an acknowledgement, based on the control fields of the receive message. When the transmission party transmits a message by setting the acknowledgement required indicator field and fails to receive an acknowledgement message for a predetermined time, the transmission party retransmits the message. Therefore, the automatic repeat request function block 512 serves to ensure reliable transmission of the message between the transmission party and the receiving party. The message processed in the automatic repeat request function block 512 is then transferred to the address function block 514.

Second, the address parameters added in the address function block 514 are the control fields for identifying a mobile station in order to indicate from which mobile station the message, mapped to one physical channel, is generated or to indicate which mobile station should receive the message. Mobile station identifying information includes a mobile station identifier field type (MSID_TYPE), a mobile station identifier field length (MSID_LEN), and a mobile station identifier field (MSID). The mobile station identifier field type MSID_TYPE includes an international mobile subscriber identity (IMSI) and a temporary mobile subscriber identity (TMSI). The mobile station identifier field length MSID_LEN has a length of at least two bytes according to the type of the mobile station identifier field type. The mobile station identifier field includes an actual mobile station identifier corresponding to the mobile station identifier field type.

With regard to the Layer 3 control message, a mobile station is identified in the address function block of the common radio burst protocol entity in the MAC sublayer and only the Layer 3 control message of the corresponding mobile station is transferred to the automatic repeat request function block. Therefore, a load on the MAC sublayer is reduced, as compared with the prior art in which every Layer 3 control message transmitted over the common signaling channel is processed in the signaling radio burst protocol entity and transferred to the upper link access control sublayer.

Third, the framing function block 516 adds a length field LEN indicating a length and a cyclic redundancy check (CRC) field for error checking, prior to transmitting the MSID-added data to the physical channel mapping entity 412.

As described above, in the embodiment, a protocol for a common MAC channel message is defined with the same protocol method as the common signaling channel and common traffic channel messages. The defined common MAC channel message is processed through the ARQ function block 512, the address function block 514 and the framing function block 516 according to the defined protocol, as shown in FIG. 5. In addition, since the messages for the common MAC channel, the common signaling channel and the common traffic channel are processed in the single common radio burst protocol module 414, the system complexity can be reduced. Further, it is possible to prevent a waste of the area for storing sequence number-related data, by using only one sequence number.

Through the function blocks 512–516 of FIG. 5, the control fields are added to the Layer 3 signaling message, the MAC message and the user data, to be transmitted over the common channel, as described above.

Figure 6A:
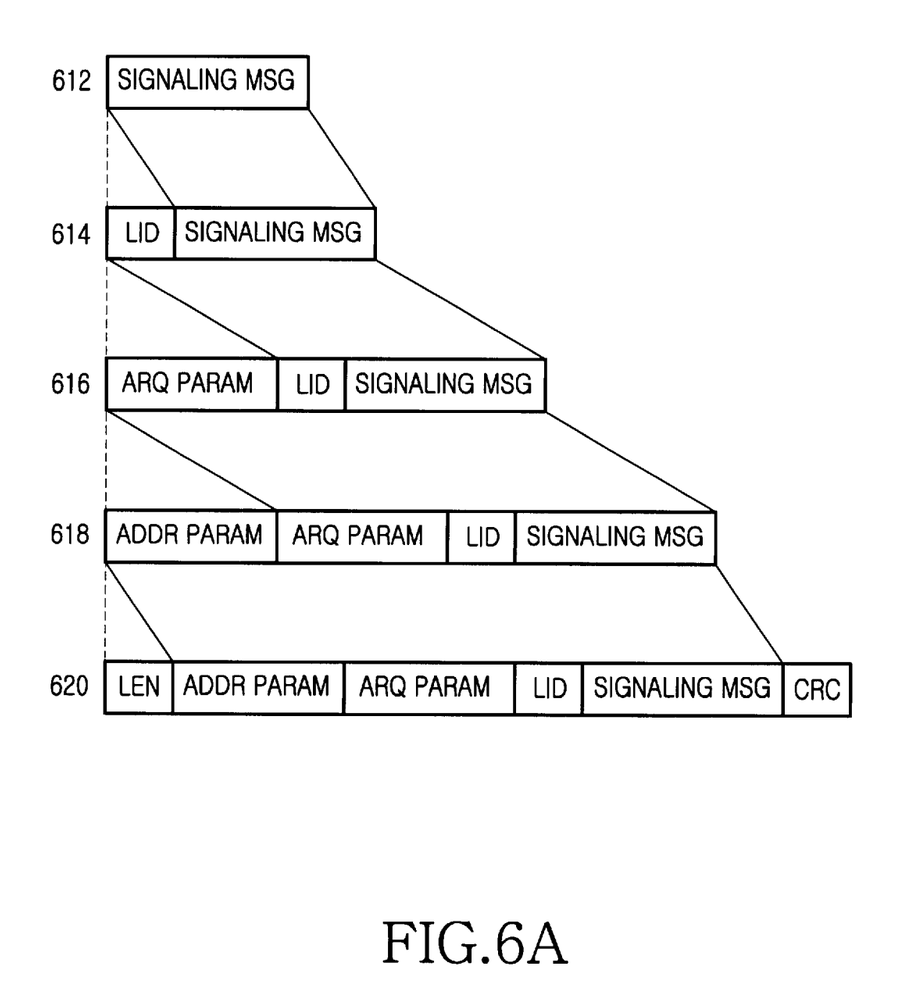
FIG. 6A is a diagram illustrating a frame format of a Layer 3 control message transmitted by a common radio burst protocol in a CDMA mobile communication system according to an embodiment of the present invention.
Figure 6B:
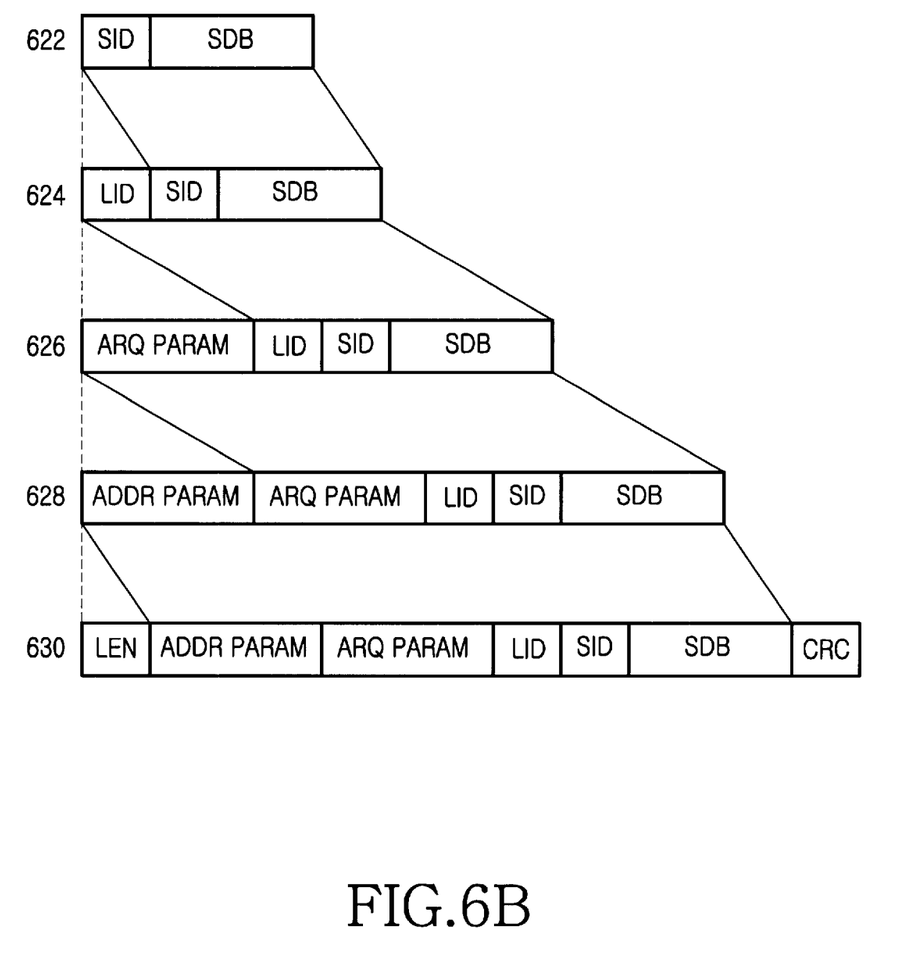
FIG. 6B is a diagram illustrating a frame format of user data transmitted by a common radio burst protocol in a CDMA mobile communication system according to an embodiment of the present invention.
Figure 6C:
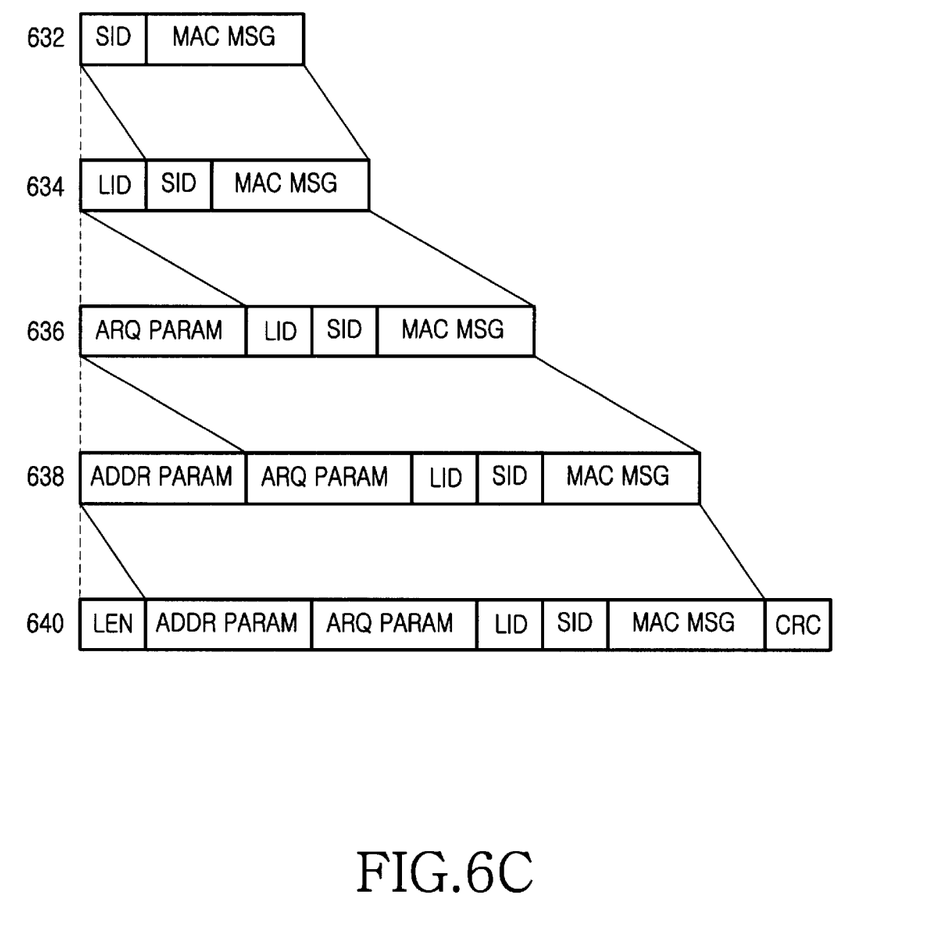
FIG. 6C is a diagram illustrating a frame format of a MAC message transmitted by a common radio burst protocol in a CDMA mobile communication system according to an embodiment of the present invention.

FIGS. 6A to 6C illustrate frame formats for messages output from the function blocks 512–516 which are eventually transferred to the physical channel mapping module 412. More specifically, FIG. 6A illustrates a frame format of a Layer 3 control message transmitted by the common radio burst protocol 414 in a CDMA mobile communication system according to an embodiment of the present invention; FIG. 6B illustrates a frame format of user data transmitted by the common radio burst protocol 414 in a CDMA mobile communication system according to an embodiment of the present invention; and FIG. 6C illustrates a frame format of a MAC message transmitted by the common radio burst protocol 414 in a CDMA mobile communication system according to an embodiment of the present invention.

With regard to the frame formats of FIGS. 6A to 6C, it is noted that various control fields are added as function blocks 512–516 process data in the common radio burst protocol entity 414. That is, it is noted that a logical channel identifier LID is added by the common logical channel mapper 416 and then transferred to the lower common radio burst protocol entity 414. When the logical channel identifier LID is added in the common logical channel mapper 416 of a transmitter, the common logical channel mapper 416 of a receiver checks the logical channel identifier LID and transfers the several kinds of messages transmitted over the common channel to a corresponding upper entity. Further, in one mobile station, the Layer 3 control message is generated by only one module. However, since the user data and the MAC control message are generated every service, service identifier SID is added in the PLICF 424 and the RMAC 440–44N and then transferred to the common logical channel mapper 416. In FIGS. 6A to 6C, "ARQ Param" represents the sequence number-related control fields added in the ARQ function block 512, and "ADDR Param" represents the MSID-related control fields added in the address function block 514.

As illustrated in FIGS. 5 and 6A–6C, the common radio burst protocol entity 414 functions as the radio burst protocol, the link access control sublayer and the ARQ function block, the address function block and the framing function block of the control channel burst protocol entity. Therefore, while each logical channel has a unique sequence number in the prior art, the common radio burst protocol entity 414 according to the present invention processes every logical channel with the same single sequence number to process the Layer 3 control message, the user data and the MAC message as the same data. Further, the physical channel mapping entity 412 has the function of mapping the Layer 3 control message, the MAC message and the user data, processed in the upper common radio burst protocol entity 414, to one of the common control channel, the paging channel or the access channel, which are physical channels.

With reference to FIG. 6A, a description will be made with regard to a procedure for transmitting a Layer 3 signaling message. For a signaling message generated in Layer 3 as shown by reference numeral 612, a header LID indicating a Layer 3 control message is added in the common logical channel mapper 416 as shown by reference numeral 614 and then transferred to the common radio burst protocol entity 414. Thereafter, an ARQ Param is added in the ARQ function block 512 of the common radio burst protocol entity 414 as shown by reference numeral 616; an ADDR Param is added in the address function block 514 as shown by reference numeral 618; and LEN and CRC are added in the framing function block 516 as shown by reference numeral 620. That is, the common radio burst protocol entity 414 adds the control files shown by 616–620 to the signaling message shown by 614.

With reference to FIG. 6B, a description will be made with regard to a procedure for transmitting user data. For a message to which a service identifier SID is added in the common traffic channel mapping entity as shown by reference numeral 622, a header LID indicating the user data is added in the common logical channel mapper 416 as shown by reference numeral 624 and then transferred to the common radio burst protocol entity 414. Thereafter, an ARQ Param including the control fields for the sequence number and the acknowledgement required indicator for ensuring reliable transmission is added to the user data in the ARQ function block 512 as shown by reference numeral 626; an ADDR Param including a mobile station identifier for identifying a transmitter and a receiver for the user data is added in the address function block 514 as shown by reference numeral 628; and a message length field LEN and a CRC field are added in the framing function block 516 as shown by reference numeral 630 and then transferred to the physical channel mapping entity 412.

With reference to FIG. 6C, a description will be made with regard to a procedure for transmitting a MAC message. For a MAC message generated in the MAC sublayer, a service identifier SID is added in the common MAC channel mapping entity as shown by reference numeral 632 and then transferred to the common logical channel mapper 416. Then, a header LID indicating the MAC message is added in the common logical channel mapper 416 as shown by reference numeral 634 and then transferred to the common radio burst protocol entity 414. Thereafter, an ARQ Param including the control fields for the sequence number and the acknowledgement required indicator for ensuring reliable transmission is added in the ARQ function block 512 of the common radio burst protocol entity 414 as shown by reference numeral 636; an ADDR Param including a mobile station identifier for identifying a transmitter or a receiver is added in the address function block 514 as shown by reference numeral 638; and a message length field LEN and a CRC field are added in the framing function block 516 as shown by reference numeral 640 and then transferred to the physical channel mapping entity 412.

For convenience, the procedure for processing various kinds of data transmitted over the common channel using one sequence number has been described with reference to a case in which the data is transferred from the upper layer channel to a physical channel. However, the reverse procedure will now be described. That is, a procedure for processing data received over the common channel is performed as the reverse of the above procedure for processing the transmission data. In addition, the data processing procedure for the common channel can be performed both at the base station and the mobile station.

Figure 7:
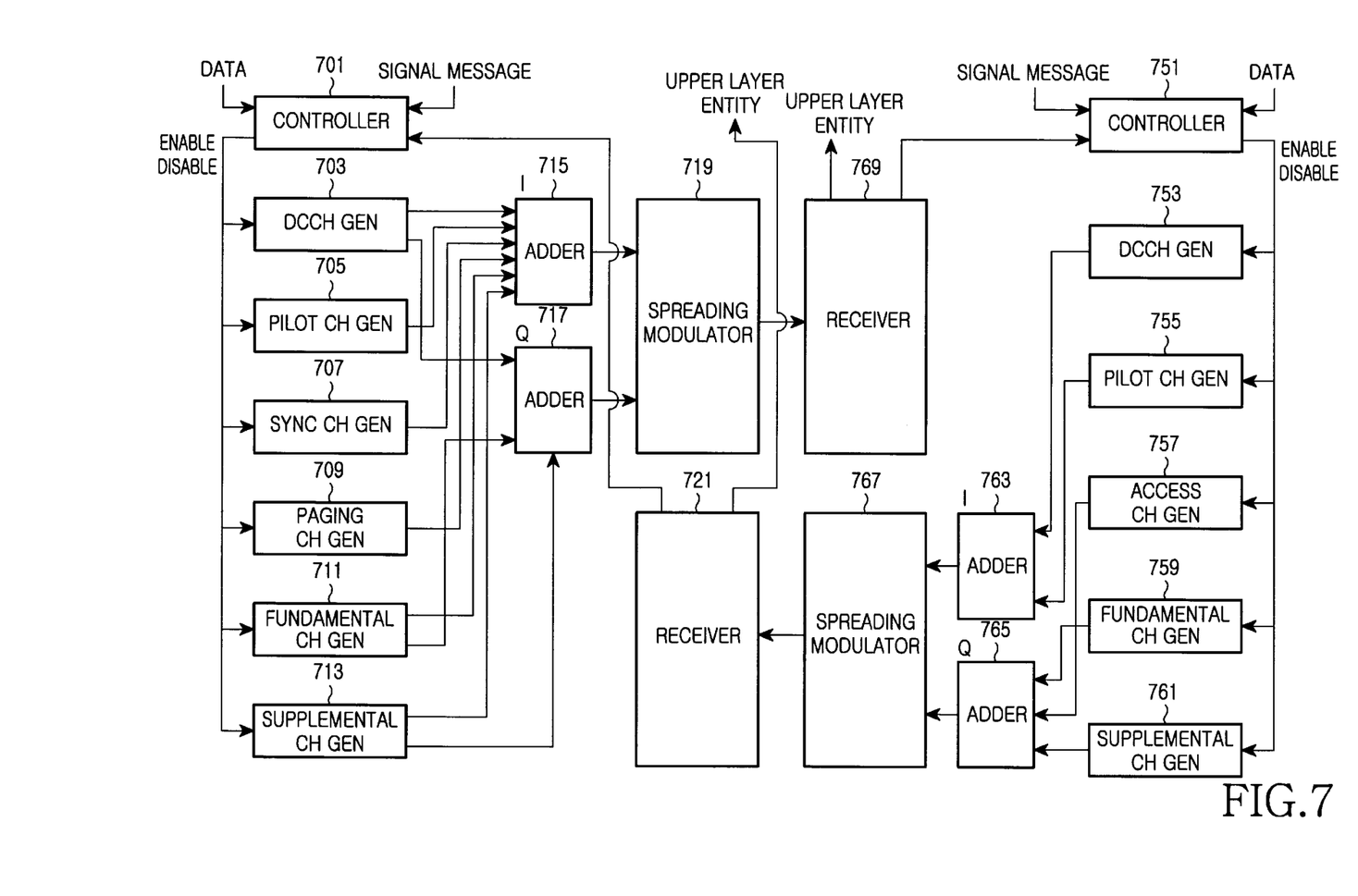
FIG. 7 is a diagram illustrating a channel structure for processing data to be transmitted over a common channel using a unified entity in a CDMA mobile communication system according to an embodiment of the present invention.

FIG. 7 illustrates a channel structure of a CDMA communication system, wherein controllers 701 and 751 process data transmitted over the common channels using the scheme shown in FIG. 4.

In FIG. 7, there are shown respective channels and associated channel transceivers, constructed between a mobile station and a base station in a CDMA communication system according to an embodiment of the present invention. For simplicity, FIG. 7 shows the channel structure, concentrating upon transmitters of the respective channels.

With regard to a channel structure of the base station, a controller 701 enables/disables respective channel generators of the base station, processes a physical layer message exchanged in the base station, and communicates a message with an upper layer. Here, the controller 701 processes data transmitted over the common channel using the scheme of FIG. 4. That is, the controller 701 processes a control message generated in Layer 3, a control message generated in a MAC sublayer and user data using a single sequence number, and transmits the processed data through the corresponding common channel.

A pilot channel generator 705, a sync channel generator 707 and a paging channel generator 709 generate common channel information which is commonly used by a plurality of users in one or several cells. A dedicated control channel (DCCH) generator 703, a fundamental channel generator 711 and a supplemental channel generator 713 generate dedicated channel information which is uniquely assigned to every user.

Herein, since the invention relates to a method for processing a message to be transmitted over the common channels, a description will be made with regard to only the common channels, being the physical channels, of the base station, and a description of the dedicated channels will be avoided.

A pilot channel generator 705 processes information transmitted over a forward link pilot channel and transmits the processed information to the mobile station. The forward link pilot channel transmits logic signals of all "1"s or all "0"s. Herein, it is assumed that the logic signals of all "0"s are transmitted over the pilot channel. The pilot channel signals enable the mobile station to perform rapid initial acquisition and channel estimation for a new multipath signal. The pilot channel spreads the pilot channel signals with a unique orthogonal code assigned thereto.

The sync channel generator 707 processes information transmitted over a forward link sync channel and transmits the processed information to the mobile station. Information transmitted over the sync channel enables mobile stations in one cell to acquire initial time synchronization and frame synchronization. The forward link sync channel spreads the sync channel information with a unique Walsh code assigned thereto.

The paging channel generator 709 processes information transmitted over a forward link paging channel and transmits the processed information to the mobile station. Information transmitted over the paging channel includes information required prior to establishment of the communication channels. The forward link paging channel spreads the paging channel information with a selected one of predetermined orthogonal codes.

The dedicated control channel generator 703 processes various control messages transmitted over a forward link dedicated control channel and transmits the processed information to the mobile station.

The fundamental channel generator 711 processes information transmitted over a forward link fundamental channel and transmits the processed information to the mobile station.

The supplemental channel generator 713 processes information transmitted over a forward link supplemental channel and transmits the processed information to the mobile station.

An adder 715 adds I-channel transmission signals for the forward link, output from the dedicated control channel generator 703, the fundamental channel generator 711 and the supplemental channel generator 713, and transmission signals output from the pilot channel generator 705, the sync channel generator 707 and the paging channel generator 709. An adder 717 adds Q-channel signals output from the dedicated control channel generator 703, the fundamental channel generator 711 and the supplemental channel generator 713. A spreading modulator 719 multiplies transmission signals output from the adders 715 and 717 by spreading sequences to spread the transmission signals, up-converts the spread transmission signals to radio frequency signals, and transmits the converted radio frequency signals. A receiver 721 down-converts respective channel signals received from the mobile station through the reverse link to baseband signals, and multiplies the down-converted baseband signals with a spreading code to despread the baseband signals. For simplicity, FIG. 7 does not illustrate reverse link channel receivers included in the base station.

With regard to a channel structure of the mobile station, a controller 751 enables/disables respective channel generators of the mobile station, processes a physical layer message exchanged in the mobile station, and communicates a message with an upper layer. Here, the controller 751 processes data transmitted over the common channel using the scheme of FIG. 4. That is, the controller 751 processes a control message generated in the Layer 3, a control message generated in a MAC sublayer and user data, using a single sequence number, and transmits the processed data through the corresponding common channel.

Herein, since the invention relates to a method for processing a message to be transmitted over the common channels, a description will be made with regard to only the common channels, being the physical channels, of the mobile station, and a description of the dedicated channels will be avoided.

An access channel generator 757 processes information transmitted over a reverse link access channel and transmits the processed information to the base station. The access channel messages include every information and control messages required by the base station prior to establishment of the communication channels.

A pilot channel generator 755 processes information transmitted over a reverse link pilot channel and transmits the processed information to the base station. The reverse link pilot channel signals enable the base station to perform rapid initial acquisition and channel estimation for a new multipath signal. In addition, the reverse link pilot channel adds power control signals to the pilot signals being transmitted, to transmit reverse power control information.

A dedicated control channel generator 753 processes various control messages transmitted over a reverse dedicated control channel and transmits the processed information to the base station.

A fundamental channel generator 759 processes information transmitted over a reverse link fundamental channel and transmits the processed information to the base station.

A supplemental channel generator 761 processes information transmitted over a reverse link supplemental channel and transmits the processed information to the base station.

An adder 763 adds transmission signals for the reverse link, output from the dedicated control channel generator 753 and the pilot channel generator 755. An adder 765 adds transmission signals for the reverse link, output from the access channel generator 757, the fundamental channel generator 759 and the supplemental channel generator 761. A spreading modulator 767 multiplies reverse link transmission signals output from the adders 763 and 765 by spreading sequences to spread the transmission signals, up-converts the spread transmission signals to radio frequency signals, and transmits the converted radio frequency signals. A receiver 769 down-converts respective channel signals received from the base station through the forward link to baseband signals, and multiplies the down-converted baseband signals with a spreading code to despread the baseband signals. For simplicity, FIG. 7 does not illustrate forward link channel receivers included in the mobile station.

As illustrated in FIG. 7, in a CDMA communication system according to an embodiment of the present invention, the base station includes the controller 701 for controlling the forward channels and manages data processing between the physical channel and the upper layer channels, the dedicated control channel generator 703, the pilot channel generator 705, the sync channel generator 707, the paging channel generator 709, the fundamental channel generator 711 and the supplemental channel generator 713. Further, the mobile station includes the controller 751 for controlling the reverse channels and manages data processing between the physical channel and the upper layer channels, the dedicated control channel generator 753, the pilot channel generator 755, the access channel generator 757, the fundamental channel generator 759 and the supplemental channel generator 761.

Accordingly, the common channel data processing method according to the present invention can be applied to both the base station and the mobile station. For example, when the base station is the transmitter, the mobile station becomes the receiver; on the contrary, when the mobile station is the transmitter, the base station becomes the receiver.

As described above, in the novel mobile communication system, common function blocks of the modules for processing a Layer 3 control message, a MAC message and user data, transmitted over common channels, are unified into one module to reduce system complexity and use only one sequence number, thereby preventing a wasted storage space regarding the sequence number-related data. In addition, an address function block is placed in a common radio burst protocol of a MAC sublayer to process every Layer 3 control message received over the common channel so as to reduce a load on a processor for transferring the processed message to an upper link access control sublayer, thereby increasing performance of the system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for processing a message transmitted over a common channel in a code division multiple access (CDMA) communication system, comprising the steps of:

a) receiving at least one of a control message generated in Layer 3, a control message generated in a medium access control (MAC) sublayer and user data, to be transmitted over a common channel;

b) mapping the at least one of a control message generated in Layer 3, the control message generated in a MAC sublayer and user data to corresponding common logical channels;

c) adding a logical channel identifier to the at least one of the control message generated in Layer 3, the control message generated in a MAC sublayer and user data, wherein said logical channel identifier defines each of the mapped corresponding common logical channels;

d) processing the logical channel identifier-added messages according to a common radio burst protocol with a single sequence number; and e) mapping the processed messages to a corresponding common physical channel.

2. The method as claimed in claim 1, wherein the step (c) comprises the steps of:

adding an automatic repeat request (ARQ) parameter including a message sequence number and an acknowledgement sequence number to the logical channel identifier-added message;

adding an address parameter including a control field for identifying a mobile station to the ARQ parameter-added message to identify a data transmitter or receiver; and adding a message length field and a cyclic redundancy check (CRC) field to the address parameter-added message to frame the message.

3. The method as claimed in claim 2, wherein the common logical channel includes a common signaling channel, a common MAC channel and a common traffic channel.

4. The method as claimed in claim 2, wherein the common physical channel is one of a common control channel, a paging channel and an access channel.

* * * * *